US008381272B1

(12) United States Patent
Nelson et al.

(10) Patent No.: US 8,381,272 B1
(45) Date of Patent: Feb. 19, 2013

(54) SYSTEMS AND METHODS FOR STRENGTHENING WEB CREDENTIALS

(75) Inventors: Jeffrey Nelson, Mountain View, CA (US); David Jeske, San Francisco, CA (US)

(73) Assignee: Google Inc., Mountain View, CA (US)

(*) Notice: Subject to any disclaimer, the term of this patent is extended or adjusted under 35 U.S.C. 154(b) by 1410 days.

(21) Appl. No.: 11/677,361

(22) Filed: Feb. 21, 2007

Related U.S. Application Data

(60) Provisional application No. 60/876,578, filed on Dec. 22, 2006.

(51) Int. Cl.
*G06F 7/04* (2006.01)
*G06F 15/16* (2006.01)
*G06F 17/30* (2006.01)
*H04L 29/06* (2006.01)

(52) U.S. Cl. ............... 726/5; 713/183; 713/184; 705/18

(58) Field of Classification Search ................ 726/5, 14, 726/17–19; 713/155, 171, 182–186; 380/28, 380/30, 277, 287; 705/18
See application file for complete search history.

(56) References Cited

U.S. PATENT DOCUMENTS

| | | | |
|---|---|---|---|
| 4,759,063 A | 7/1988 | Chaum | |
| 4,991,210 A | 2/1991 | Chaum | |
| 7,664,960 B1* | 2/2010 | Clubb | 726/19 |
| 7,930,553 B2* | 4/2011 | Satarasinghe et al. | 713/184 |
| 2001/0055388 A1* | 12/2001 | Kaliski, Jr. | 380/30 |
| 2004/0093527 A1 | 5/2004 | Pering et al. | |
| 2004/0230843 A1 | 11/2004 | Jansen | |

OTHER PUBLICATIONS

J. Alex Halderman et al., "A convenient method for securely managing passwords" International World Wide Web Conference Proceedings of the 14th international conference on World Wide Web (IW3C2), Chiba, Japan, pp. 471-479, May 10-14, 2005.*
Ross, et. al.; "Stronger Password Authentication Using Browser Extensions"; Proceedings of the 14th Usenix Security Symposium; 2005. Downloaded from http://crypto.stanford.edu/PwdHash/#publications on Oct. 25, 2007; 15 pages.
Halderman, et. al.; "A Convenient Method for Securely Managing Passwords"; Proceedings of the 14th international conference on World Wide Web, 471-479; 2005. Downloaded from http://www.cs.princeton.edu/~jhalderm/papers/#password on Oct. 25, 2007; 9 pages.
Real User Corporation; "Strategies for using PassFaces™ for Windows"; 2002; 8 pages.
Dhamija, R. et al.; "The Battle Against Phishing: Dynamic Security Skins"; Proceedings of the Symposium on Usable Privacy and Security (SOUPS), 93:77-88; 2005; pp. 77-88.

(Continued)

*Primary Examiner* — Jeffrey Pwu
*Assistant Examiner* — Jayesh Jhaveri
(74) *Attorney, Agent, or Firm* — Sterne, Kessler, Goldstein & Fox PLLC

(57) ABSTRACT

The present invention relates to systems and methods for securing web-based transactions. A system for securing web-based transactions includes a credential strengthener coupled to a client browser. The client browser communicates with a web server in a web-transaction. The credential strengthener converts a web credential entered by a user at the client browser to a higher entropy web credential associated with the user. The client browser then returns the higher entropy web credential for further use in the web transaction. A method for securing a web-based transaction includes steps of converting a web credential entered by a user at a client browser to a higher entropy web credential associated with the user, and returning the higher entropy web credential to the web server to continue the web transaction.

16 Claims, 7 Drawing Sheets

OTHER PUBLICATIONS

Bank of America Corporation; "SiteKey Frequently Asked Questions"; 2007. Downloaded from http://www.bankofamerica.com/onlinebanking/index.cfm?template=site_key&state=MD on Sep. 24, 2007; 4 pages.

Nelson, et al. U.S. Appl. No. 11/677,366, filed Feb. 21, 2007, entitled "Systems and Method for Authenticating Web Displays with a User-Recognizable Indicia"; 34 pages.

* cited by examiner

At Remote Strengthening Server 130B

At Password Strengthener 130A

SYSTEMS AND METHODS FOR STRENGTHENING WEB CREDENTIALS

CROSS-REFERENCE TO RELATED APPLICATIONS

This application claims the benefit of U.S. Provisional Appl. No. 60/876,578, filed Dec. 22, 2006, and incorporated by reference herein in its entirety.

This application is related to a co-pending, commonly-owned patent application, "Systems and Methods for Authenticating Web Displays with User Recognized Indicia," application Ser. No. 11/677,366, filed herewith by the same inventors and incorporated in its entirety herein by reference.

BACKGROUND

1. Field of the Invention

The present invention relates to web security.

2. Related Art

The emergence and development of computer networks and protocols, including the World Wide Web (or simply "web"), has allowed many users to engage in a variety of transactions. Transactions over the web are often carried out between a browser and a web server. A user at a client device operates the browser. The browser (also called a client browser) is coupled over one or more networks, such as the Internet, to the web server. The web server in turn can be part of or coupled to another server that manages the transaction. These transactions can involve shopping, commerce, news, information, trade, registration, enrollment, entertainment, game play, or many other types of applications depending upon the entities involved. Such entities can be businesses, governments, organizations, individuals or others that wish to carry out transactions over the web with remote users.

To provide security, web transactions often require a user to input a credential, hereafter referred to as a web credential. Such a credential can be a password associated with the user that is used to authenticate the web transaction. The password can be a number of characters (alphanumeric or other types of characters or data). While users recall passwords in terms of characters, computers carrying out a web transaction often manipulate binary representations of the credentials in bits of data. Security strength of credentials against brute force and dictionary attacks is measured in terms of bits of information entropy or Shannon entropy, hereafter referred to simply as entropy. Credentials with high entropy provide high security; they are not vulnerable to brute force or dictionary attacks. Human memorizable passwords may have low entropy, around 22 bits of entropy. Users have difficulty remembering or managing web credentials with sufficiently high entropy to be secure. Accordingly, it is desirable in many web transactions to allow users to remember low entropy web credentials, despite the security weakness.

Phishing is an expensive type of fraud that causes users to give away their passwords to illegitimate web sites. A phisher operates a rogue website that spoofs a legitimate web site. The rogue web site is often set up to look nearly identical to the legitimate web site with similar logos, graphics, text or visual appearance. The rogue website is then operated to capture a user's personal information using social engineering attacks. Phishing can be viewed as a type of man in the middle attack in which the attacker is able to intercept certain communications by imitating a trusted party in a communication.

In a phishing attack, the phisher attempts to lure the victim to the rogue website. One way phishers operate is to launch a phishing campaign by spamming a large numbers of email messages sent to a large number of different users. Links to the rogue website are embedded in the email messages and the users are encouraged to select the link. Once a user selects the link, the user is then directed to the rogue website and may be misled into providing personal information. The phisher uses social engineering to incite the user to action, implying eminent account cancellation, credit proceedings, or even offering monetary incentives in exchange for personal information. Such personal information can include any type of information sought by the phisher, such as, credit card information, account numbers, user names, and passwords. A phisher can then try to exploit the personal information to gain access to financial accounts, impersonate a user, or cause other harm or damage.

Limited solutions have been proposed to defeat phishing. PwdHash [http://pwdhash.com] is a browser extension that performs domain hashing. A user password is converted to a domain-specific password. In particular, PwdHash appears to replace passwords with a one-way hash of the pair of data (password, domain-name). A phisher operating a spoof web page may only then see a hash of the password specific to the domain hosting the spoof page. However, among other things, the PwdHash approach does not produce a high entropy, cryptographically strong credential. The hash of PwdHash remains vulnerable to dictionary attacks, if the hash is captured by a phishing attacker.

PasswordMultiplier [http://www.cs.princeton.edu/~jhalderm/projects/password/] is a browser extension that performs domain hashing and uses a technique called slow hashing. However, among other things, the PasswordMultiplier approach also does not produce a high entropy, cryptographically strong credential and remains vulnerable to dictionary attack, although the dictionary attack is more expensive than with traditional approaches to hashing.

What is needed are improved systems and methods for securing web-based transactions.

SUMMARY OF THE INVENTION

The present invention relates to systems and methods for securing web-based transactions. In an embodiment, a system for securing web transactions includes a credential strengthener coupled to a client browser. The client browser communicates with a web server in a web transaction. The credential strengthener converts a web credential entered by a user at the client browser to a higher entropy web credential associated with the user. The client browser then returns the higher entropy web credential for further use in the web transaction.

In one example, the credential strengthener may include a web credential strengthener at the client browser and a remote strengthening server coupled to the web credential strengthener over a network.

In a further embodiment, a method for securing a web-based transaction includes steps of converting a web credential entered by a user at a client browser to a higher entropy web credential associated with the user, and returning the higher entropy web credential to the web server to continue the web transaction.

According to a feature, the high entropy credential is further a cryptographically strong credential created according to a cryptographic algorithm.

In this way, by applying secret strengthening to a low entropy web credential and returning a relatively high entropy web credential, it is impossible for a phisher to re-use the high entropy web credential in other web transactions that expect a low entropy web credential or to derive the original low entropy credential. As a result, financial damage or other harm from phishing may be prevented as phishers no longer can misuse original low entropy credential information gathered in a phishing campaign. At the same time, users may continue to use relatively low entropy credential information in web transactions without being compromised by phishers.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENTS

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The present invention relates to systems and methods for securing web-based transactions. The present invention is described with respect to a World Wide Web environment operating on one or networks, such as, the Internet. Such an environment is illustrative and not intended to limit the present invention.

Figure 1:
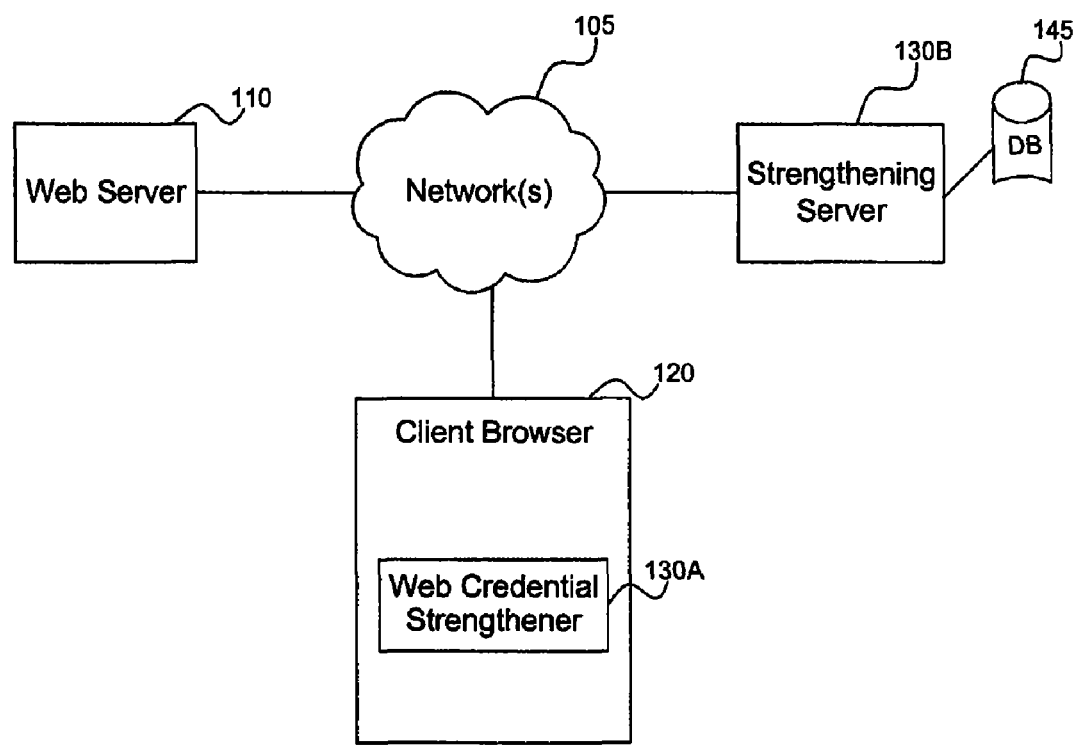
FIG. 1 is a diagram of a system for securing web-based transactions according to an embodiment of the present invention.

FIG. 1 shows a system 100 for securing web-based transactions according to an embodiment of the present invention. System 100 includes a web server 110 coupled to a client browser 120 over one or more networks 105. Network(s) 105 can be any type of network or combination of networks including, but not limited to, a wide area network, such as the Internet, a medium area network, and/or a local area network. A credential strengthener 130 includes a web-credential strengthener 130A and one or more remote strengthening servers 130B. One or more databases 145 can be coupled to strengthening server 130B.

In one example as shown in FIG. 1, web credential strengthener 130A is provided as part of a client browser 120. In particular, web credential strengthener 130A can be a security extension for a client browser 120. Strengthening server 130B is provided in a remote location and coupled to client browser 120 and web credential strengthener 130A over network(s) 105. Strengthener server 130B can also communicate with and pass data to and from one or more databases 145. Database 145 can be locally or remotely coupled to strengthener server 130B.

In operation, client browser 120 communicates with web server 110 over network 105 to carry out a web transaction. Web server 110 serves data necessary to complete a web transaction to client browser 120. Client browser 120 in turn provides data necessary to complete the web transaction to web server 110. As is well known, a variety of transactions may be carried out over the web. These transactions can involve shopping, commerce, news, information, trade, registration, enrollment, entertainment, game play, or many other types of applications depending upon the entities involved. Such entities can be businesses, governments, organizations, individuals or others that wish to carry out transactions over the web with remote users. Web server 110 in turn can be coupled to other servers (not shown) to support different web transactions. The term "web transaction" as used herein is meant to be inclusive and not limiting, and can be any transaction carried out over computer network(s) using web-related technology or protocols known now or developed in the future.

Many web transactions require a user to input a credential at client browser 120. In general, security is improved if a credential is entered which has a high entropy. A high entropy credential, for example, may be a credential having a large number of bits in its binary representation including, but not limited to, a number of bits that equals or exceeds 128 bits. Users, however, may have difficulty remembering or managing high entropy credentials. Accordingly, many users use credentials that are of low entropy. Such a low entropy credential may be a 4-12 character password represented by a small number bits of entropy, approximately 20-24 bits, less than the 128 bits needed for a high level of security. Accordingly, one problem in many of conventional web-transactions as described above is the use of low entropy credentials being passed between client browser 120 and web server 110 to carry out web-based transactions.

According to a feature of the present invention, a credential strengthener 130 including web credential strengthener 130A and strengthening server 130B operate to convert a web credential entered by a user at client browser 120 to a higher entropy web credential associated with the user. Client browser 120 then automatically returns the higher entropy web credential to web server 110. In this way, web transactions are supported with higher entropy web credentials yet users need only to remember or manage low entropy credentials. According to a feature, a cryptographically secure, higher entropy web credential is returned.

Figure 2:
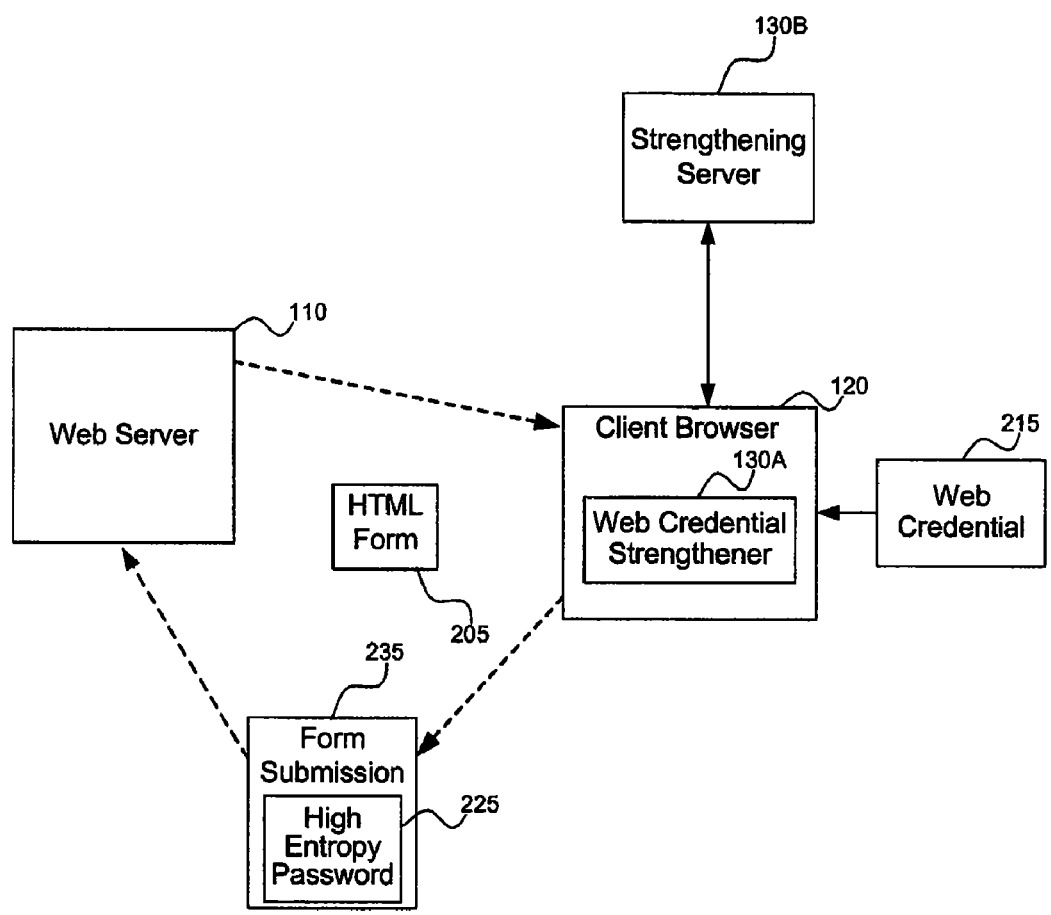
FIG. 2 is a diagram that shows example information passed to and from a client browser in the system of FIG. 1.

FIG. 2 shows the operation of system 100 in an example web transaction. When the web transaction is initiated web server 110 sends a form, such as, a form 205 in a hypertext mark-up language (HTML) to client browser 120. HTML form 205 includes a request for a credential from a user. For example, HTML form 205 may include a field or box with text indicating to the user that he or she should enter a web credential, such as, a password. A user then enters web credential 215 associated with the particular transaction.

Credential strengthener 130 made up of web credential strengthener 130A and remote strengthening server 130B, then converts web credential 215 from a relatively low entropy to a higher entropy web credential 225 according to a cryptographically strong algorithm. For example, a low entropy password input by user made up of a relatively few characters corresponding to a relatively small number of bits can be converted to a high entropy password represented by a larger number of bits. Then, client browser 120 prepares a form submission 235 for return to web server 110. Credential strengthener 130 inserts high entropy web credential 225 in form submission 235. In this way, the high entropy password 225 can be automatically returned as part of form submission 235 to web server 110 to continue the web transaction.

Credential strengthener 130 carries out a secret strengthening protocol to convert low entropy credentials to cryptographically secure, higher entropy credentials. Such a secret strengthening protocol can be implemented with a cryptographic algorithm, including but not limited to, the following algorithms: a RSA cryptographic algorithm, a quadratic residue cryptographic algorithm, an elliptical curve cryptographic algorithm, a Ford-Kaliski cryptographic algorithm, a Chaum blind signature cryptographic algorithm, or other homomorphic encryption algorithm.

In one embodiment, a Chaum blind signature cryptographic algorithm is used and carried out jointly by web credential strengthener 130A and strengthening server 130B. The operation of such a credential strengthener 130 will be described in further detail below with respect to FIGS. 3, 4, and 5A-5B.

Figure 3:
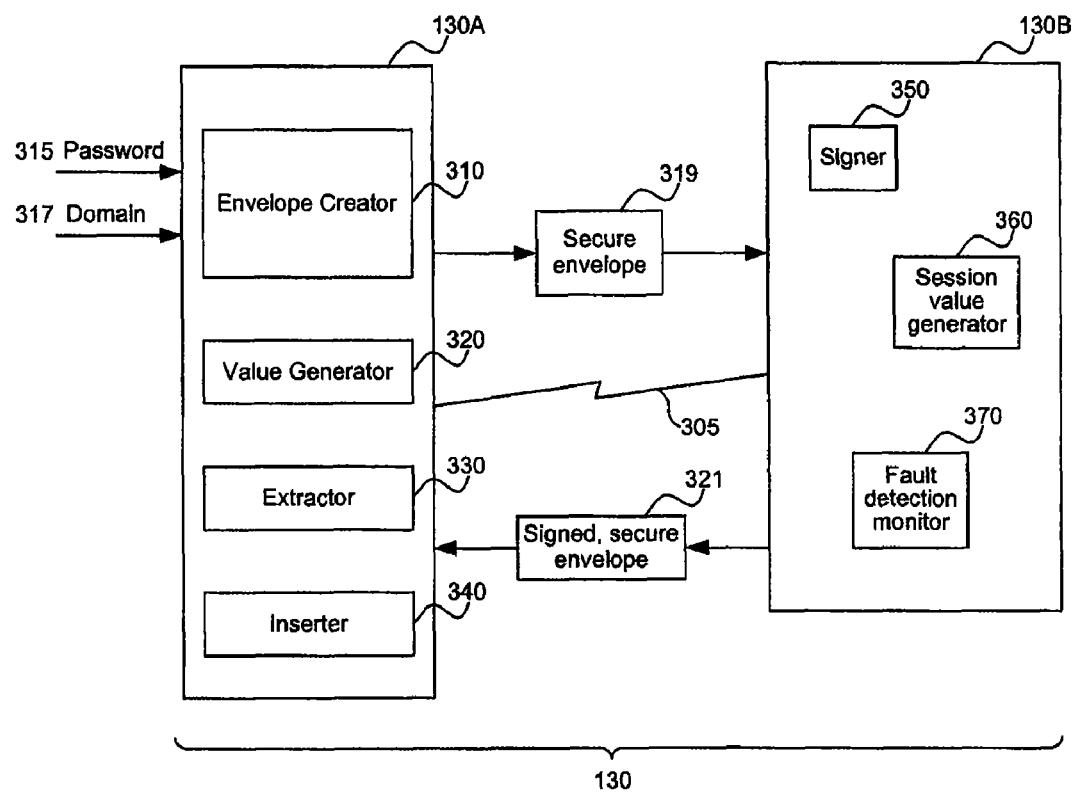
FIG. 3 is a diagram that shows components of a credential strengthener according to an embodiment of the present invention.

FIG. 3 shows an example credential strengthener 130 according to an embodiment of the present invention. In one example, credential strengthener 130 carries out a Chaum blind signature cryptographic algorithm to strengthen a web credential. In this example, web credential strengthener 130A includes an envelope creator 310, value generator 320, extractor 330, and an inserter 340. Remote strengthening server 130B includes a signer 350 and session value generator 360.

An optional fraud detection monitor 370 can also be provided. Fraud detection monitor 370 can be used to monitor requests to the secret strengthening provider 130B in order to detect an attacker. Where a fraud detection monitor 370 is used, preventative measures may be made available to block anyone submitting a large number of failed authentication attempts. Preventative measures to prevent attacks may also include blocking account access, blocking IP access, rate limiting, serving CAPTCHA requests, or flagging suspicious traffic for additional audit reviews.

For brevity, the operation of credential strengthener 130 will be described with respect to the method 400 set out in FIGS. 4, 5A, and 5B. Method 400, however, is not necessarily limited to the structure of system 100 and credential strengthener 130.

Figure 4:
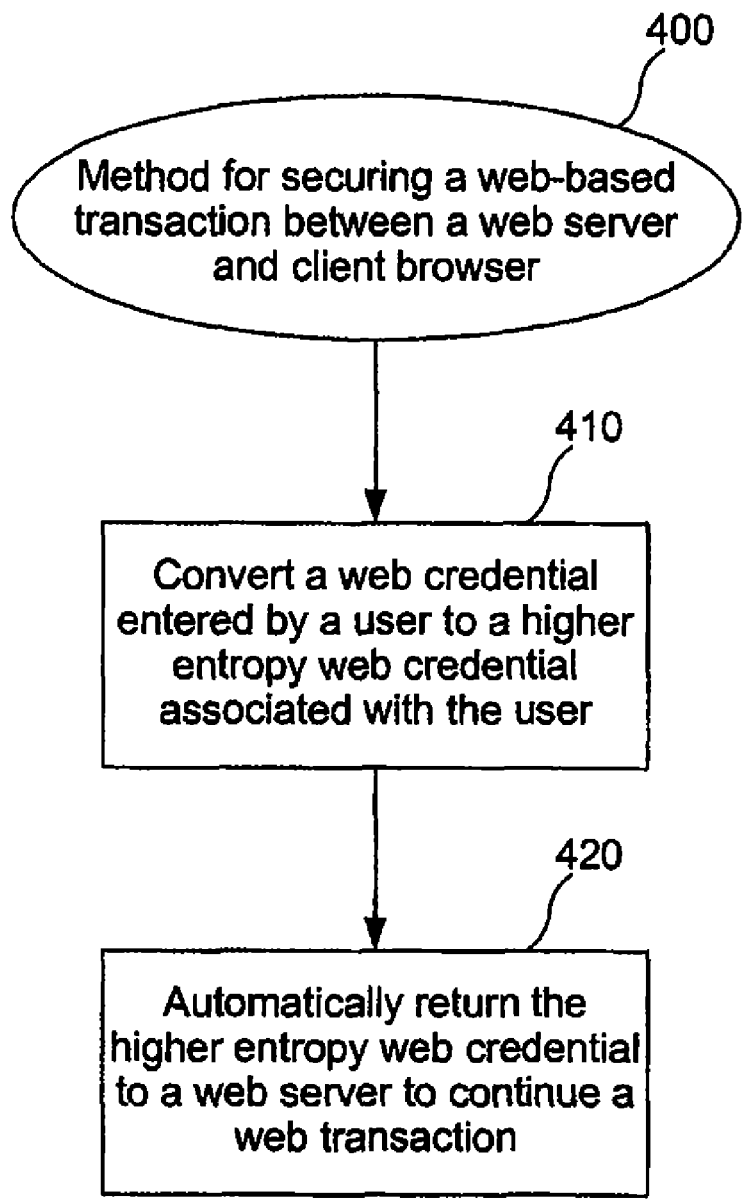
FIG. 4 is a diagram of a method for securing a web-based transaction according to an embodiment, of the present invention.
Figure 5A:
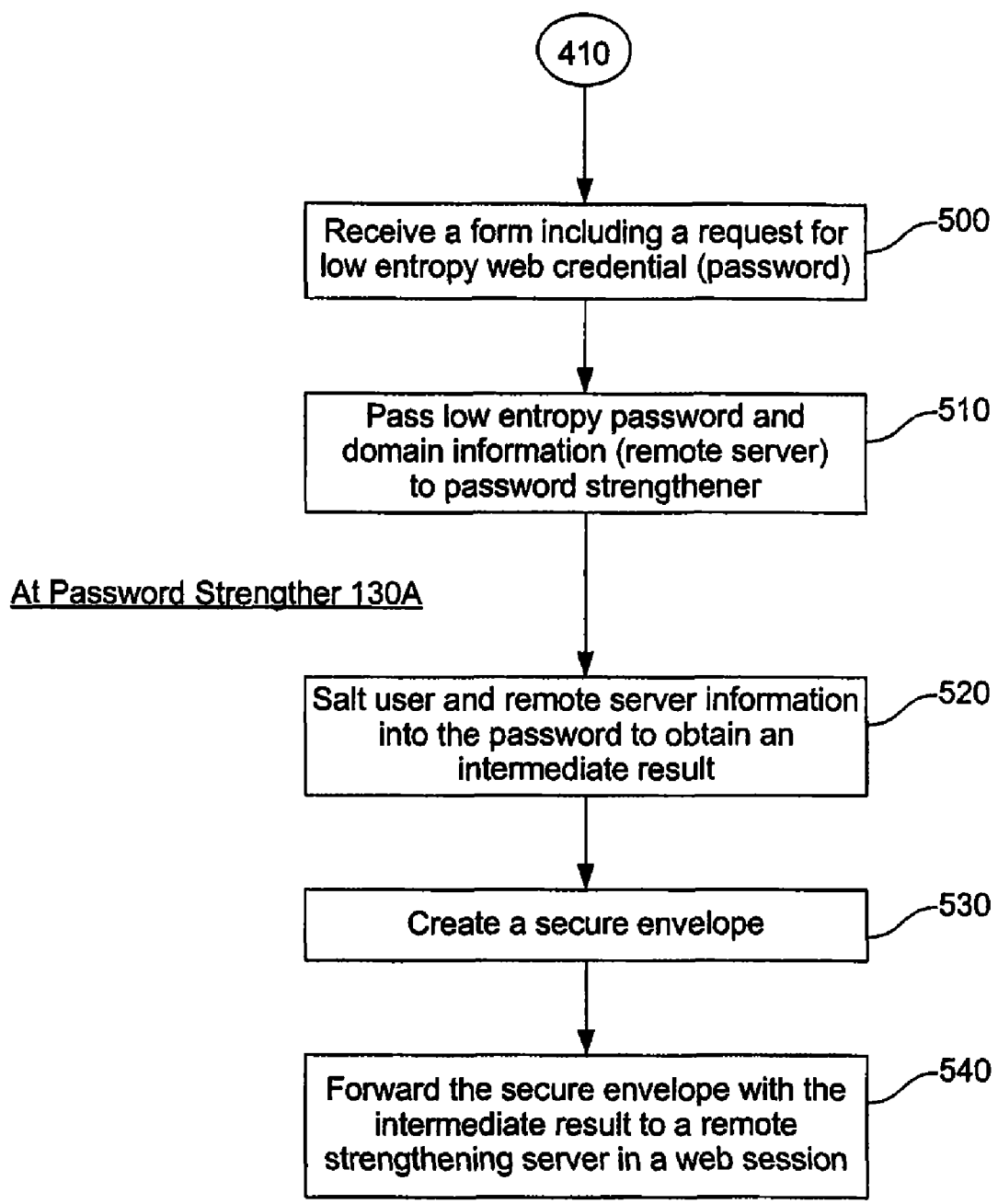
FIGS. 5A and 5B are flow charts that illustrate conversion of a web credential in further detail.
Figure 5B:
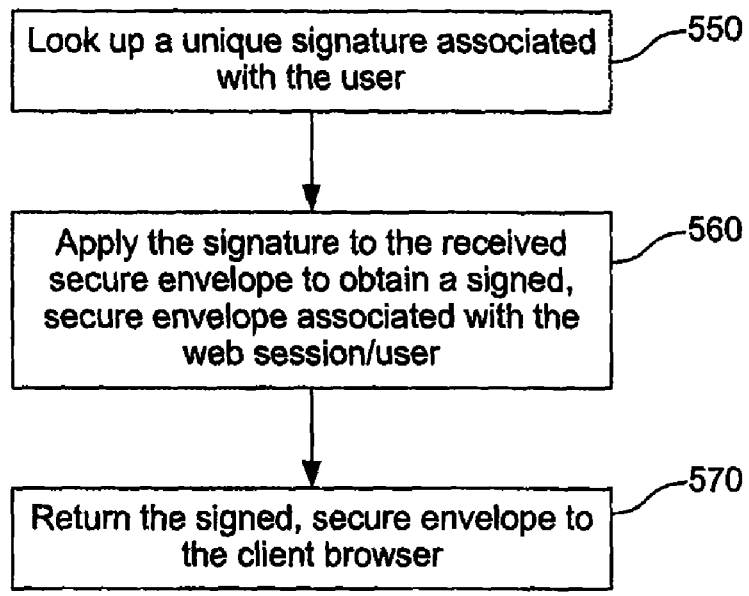
Figure 5B:
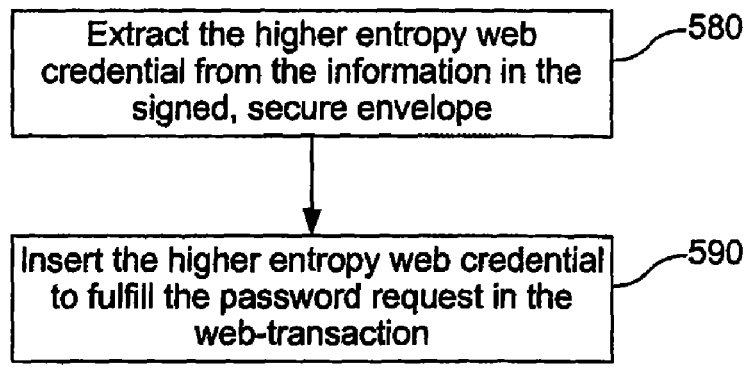

As shown in FIG. 4, a method 400 for securing a web-based transaction between a web server 110 and client browser 120 is provided (steps 410-420). In step 410, a web credential entered by user is converted to a higher entropy web credential associated with the user. In step 420, the higher entropy web credential is returned to web server 110 to continue the web-transaction. The higher entropy web credential can be automatically returned without involvement by the user. Alternatively, the higher entropy web credential can be returned semi-automatically or manually with more involvement by the user in the process depending upon a particular application or need.

The operation of step 410 is described in further detail below with respect to FIGS. 5A and 5B and the example credential strengthener 130 in FIG. 3. As shown in FIGS. 5A and 5B, conversion of the web credential requires different functions to be carried out between web credential strengthener 130A and remote strengthening server 130B. As shown in FIG. 5A at web credential strengthener 130A, client browser 120 receives a form 215 that includes a request for a low entropy web credential (step 500). Any type of web credential can be used depending upon the web transaction. Examples include, but are not limited to a password, PIN, identifying secret, token, or other user identifying information. The identifying information for the user can be some combination of username, full name, social security number, credit card number, drivers license number, and/or mailing address.

For clarity, the remainder of this operation is described with respect to the example where the web credential is a password. For instance, this request received by client browser 120 in step 500 can be a text box or field for inputting a password 315. For the case where web credentials other than passwords are used, such credentials may be represented as a binary sequence of bits and encoded into a text string, which can then be treated as a password.

Client browser 120 also receives information that identifies the domain of web server 110. Such domain information 317 can include, but is not limited to, all or part of a URL address of the web server 110 (or another server or identifier associated with the web transaction). For example, if the web server 110, is a web site with a host name, www.google.com, then the domain name is "google.com". The domain information for the remote server can be some combination of host name, domain name, IP, TLS session information, or SSL certificate meta data. The received low entropy password 315 and the domain information 317 is then passed to web credential strengthener 130A (also called password strengthener 130A for this example involving a password but works similarly for other types of web credentials) (step 510).

Password strengthener 130A salts user information and domain information 317 into the password 315 to obtain an intermediate result (step 520). For example, value generator 320 creates a session value K which is salted with password 315 and domain information 317 to obtain the intermediate result. In one implementation, information identifying the user and the remote server are salted into the password through the use of SHA-1 message digest algorithm. Other message digest algorithms can be used for password salting, such as MD2, MD4, MD5, SHA-2, RIPEMD, ADLER, TIGER, PANAMA, CRC, or other message digests. By salting the identifying information, such as domain name and user name, into the password to derive an intermediate value, the intermediate value can not be re-used to authenticate to different web sites or across different user names. Envelope creator 310 creates a secure envelope 319 (step 530) using a cryptographic algorithm.

In step 540, password strengthener 130A sends or forwards secure envelope 319 with the intermediate result to remote strengthening server 130B in a session over communications link 305. Link 305 can be any type of network link, including but not limited to, wired and/or wireless links over network 105.

Steps 550-570 are carried out at remote strengthening server 130B. A unique signature associated with the user is looked up (step 550). For example, session value generator 360 generates a unique session value associated with the session in which secure envelope 319 has been received. User information is also identified from secure envelope 319. Remote strengthening server 130B then looks up (or generates) a higher entropy credential associated with the session value and user information. In one example such a higher entropy credential associated with the session value and user information includes at least 128 bits in a binary representation.

In step 560, signer 350 applies a digital signature to the secure envelope 319 to obtain a signed, secure envelope 321 associated with the session and user. The electronic signature provided is a signature corresponding to the user. The higher entropy credential looked up is also added to the envelope 319 prior to signature. Remote strengthening server 130B returns the signed, secure envelope 321 to client browser 130A (step 570). The signature is illustrative and not intended to necessarily limit the present invention. Other types of digital signature or encryption can be used.

In another example, a secret strengthening protocol managed by a third party strengthening provider (or consortium of providers) operates one or more strengthening servers 130B, provided to generate the signed, secure envelope 321. This third party strengthening provider could be remotely coupled to web credential strengthener 130A over network 105 and could act as a service that provides secret strengthening. The resulting cryptographically strong secret generated by the third party strengthening provider can then be incorporated into web credential 215 and web server 110. In this way, reliability and trust of strengthening server 130B can be distributed across one provider (or a consortium of providers) to enhance the security of web credential 215.

Steps 580 and 590 are carried out at password strengthener 130A. In step 580, extractor 330 extracts the higher entropy web credential from the information in the received signed, secure envelope 321. Inserter 340 inserts or makes available the higher entropy web credential to fulfill the password request in the web-transaction (step 590). Control then passes to step 420 as described above.

User Recognition and Credential

Figure 6:
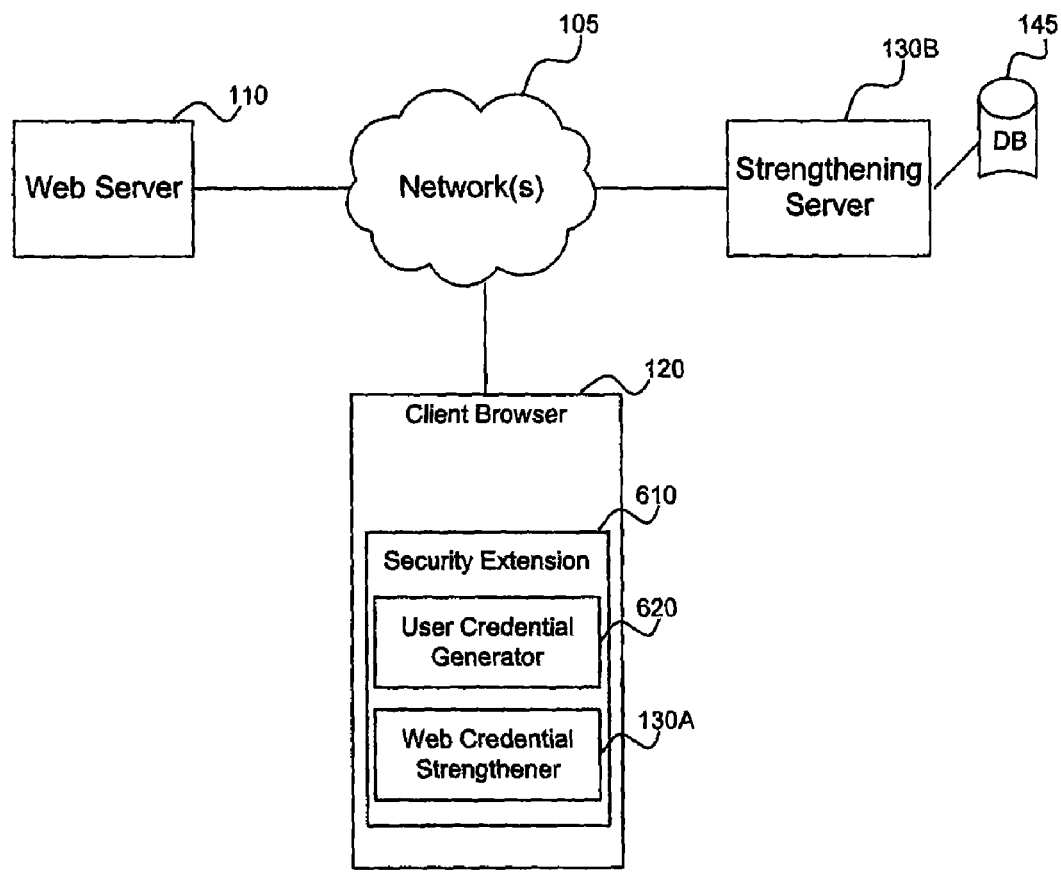
FIG. 6 is a diagram of a system for securing web-based transactions that combines user recognizable indicia and strengthened web credentials according to a further embodiment of the present invention.

FIG. 6 is a diagram that shows a system 600 for securing web-transactions according to a further embodiment of the present invention. System 600 is like system 100 described above but further includes a user credential generator 620. User credential generator 620 can be a generator that generates a recognizable user indicia in response to a request for a credential in a transaction. For example, when a HTML form 205 is received that requests a web credential, user credential generator 620 displays a customized recognizable image that the user can trust. In this way, a user can be taught to only input a credential, such as, a password, when the user recognizes the displayed indicia. See, for example, U.S. Provisional Appl. No. 60/876,578, filed Dec. 22, 2006, and incorporated by reference herein in its entirety, and the co-pending, commonly-owned patent application, "Systems and Methods for Authenticating Web Displays with User Recognized Indicia," application Ser. No. 11/677,366, filed herewith, by the same inventors and incorporated in its entirety herein by reference.

In one example, not intended to limit the present invention, user credential generator 620 and web credential strengthener 130A are provided as a security extension 610 to client browser 120. Web credential strengthener 130A operates as described above with respect to a system 100. User credential generator 620 in combination with credential strengthener 130B has the advantage of providing additional security for the web transaction. In particular, the user credential generator 620 provides an additional measure of trust by displaying a recognizable indicia when a user is asked to input a credential. Web credential strengthener 130A in cooperation with strengthening server 130B provides a higher entropy web credential in web transactions that can foil phishers as described above.

Further Examples and Features

In another embodiment, credential strengthener 130 need not include a remote strengthening server 130B. Instead, the web credential after salting is validated using a zero knowledge proof instead of transfer to the remote server 130B.

In another example, the resulting cryptographically strong credential is used as a key to perform other cryptography tasks. Such cryptography tasks may include but not be limited to deriving additional cryptographic keys, one time pads, time based pads, encrypting messages, digitally signing messages, email encryption, AJAX encryption, JavaScript encryption, HTTPS session encryption, TLS session encryption, storing encrypted data, unlocking remote data stores, encrypting or signing financial transactions, electronic voting, or other applications of encryption.

Example Implementations

Client browser 120 can be run any computing or processing device that supports a browser. Any type of browser may be used including, but not limited to, Internet Explorer available from Microsoft Corp., Safari available from Apple Corp., Firefox, Opera, or other type of proprietary or open source browser. Example client devices, include, but are not limited to, any type of processing device including, but not limited to, a computer, workstation, distributed computing system, embedded system, stand-alone electronic device, networked device, mobile device, set-top box, television, or other type of processor or computer system.

Credential strengthener 130, including web credential strengthener 130A and remote strengthener 130B, can be implemented in software, firmware, hardware, or any combination thereof. Depending upon the particular implementation, credential strengthener 130 and its components can be implemented on the same or different devices and can be made to operate with a variety of applications.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A system for securing web-based transactions, comprising:
   a client browser that communicates with a web server in a web-transaction; and
   a credential strengthener coupled to the client browser;
   wherein the credential strengthener includes a web credential strengthener, at the client browser, coupled to a remote strengthening server over a network configured to convert a web credential entered by a user at the client browser to a higher entropy web credential associated with the user having more entropy bits than the web credential entered by the user including salting user and remote server domain information into the web credential entered by the user to obtain an intermediate result that is used to obtain the higher entropy web credential, and the client browser returns the higher entropy web credential to the web server.

2. The system of claim 1, wherein the credential strengthener converts the web credential entered by a user at the client browser to a cryptographically secure, higher entropy web credential associated with the user using a cryptographically secure algorithm.

3. The system of claim 1, wherein the web credential strengthener creates a secure envelope, and forwards the secure envelope with the intermediate result to the remote strengthening server in a web session.

4. The system of claim 3, wherein the remote strengthener server applies a signature to the received secure envelope to obtain a signed, secure envelope associated with the web session, and returns the signed, secure envelope to the client browser.

5. The system of claim 4, wherein the web credential strengthener extracts the higher entropy web credential from the information in the signed, secure envelope and inserts the higher entropy web credential in the response the client browser automatically returns in response to the request for the user to input the web credential at the client browser in the web-transaction.

6. The system of claim 1, wherein the web credential entered by a user and the higher entropy web credential have respective binary representations made up of a number of bits, the number of bits for the higher entropy web credential being greater than the number of bits for the web credential.

7. The system of claim 6, wherein the higher entropy web credential has at least 128 bits.

8. The system of claim 6, wherein the higher entropy web credential has at least 256 bits.

9. The system of claim 1, wherein the web credential comprises a password or a sequence of bits.

10. The system of claim 1, wherein the credential strengthener converts a password entered by a user at the client browser to a higher entropy password associated with the user using a Chaum blind signature algorithm.

11. The system of claim 1, wherein the client browser automatically returns the higher entropy web credential to the web server.

12. A computer-implemented method for securing a web-based transaction for a client browser coupled to a web server over a network, comprising:
   converting a web credential entered by a user at the client browser to a higher entropy web credential associated with the user having more entropy bits than the web credential entered by the user, wherein the converting includes salting user and remote server domain information into the web credential entered by the user to obtain an intermediate result that is sent to a remote strengthening server over a network to obtain the higher entropy web credential; and
   returning the higher entropy web credential to the web server to continue the web-based transaction.

13. The method of claim 12, wherein the converting includes using a cryptographically secure algorithm to obtain a cryptographically secure, higher entropy web credential associated with the user.

14. The method of claim 12, wherein the converting comprises:
   creating a secure envelope, and
   forwarding the secure envelope with the intermediate result to the remote strengthening server in a web session.

15. The method of claim 14, further comprising at the remote strengthening server:
   looking up a digital signature associated with the user;
   applying the signature to the received secure envelope to obtain a signed, secure envelope associated with the web session/user; and
   returning the signed, secure envelope to the client browser.

16. The method of claim 15, further comprising at the client browser:
   extracting the higher entropy web credential from information in the signed, secure envelope and inserting the higher entropy web credential in a response the client browser returns.

* * * * *